United States Patent [19]

Senso et al.

[11] Patent Number: 5,111,303
[45] Date of Patent: May 5, 1992

[54] VIDEO SIGNAL RECORDING SYSTEM AND PICTURE DISPLAY SYSTEM IN A HIGH-DEFINITION TELEVISION SYSTEM

[75] Inventors: Hitoshi Senso; Yoshio Arai; Masao Fukuda, all of Tokyo, Japan

[73] Assignee: Pioneer Electronic Corporation, Tokyo, Japan

[21] Appl. No.: 440,169

[22] Filed: Nov. 22, 1989

[30] Foreign Application Priority Data

Feb. 27, 1989 [JP] Japan .................................. 1-43171
Feb. 27, 1989 [JP] Japan .................................. 1-43173

[51] Int. Cl.$^5$ ............................................ H04N 5/76
[52] U.S. Cl. ........................................ 358/335; 360/9.1
[58] Field of Search ............... 358/310, 335, 87, 342, 358/108, 93; 360/35.1, 9.1, 8, 32

[56] References Cited

U.S. PATENT DOCUMENTS 3,983,328  9/1976  Newell ............................ 358/342 X
4,660,096  4/1987  Arlan et al. ..................... 360/35.1 X
4,939,586  7/1990  Nabati et al. ..................... 360/32 X Primary Examiner—Robert L. Richardson
Attorney, Agent, or Firm—Sughrue, Mion, Zinn Macpeak & Seas

[57] ABSTRACT

A video signal recording system is provided in which the number of horizontal scanning lines of a high-definition television system video signal is converted to be M times as large as the number of horizontal scanning lines of an ordinary television video signal. The converted video signal is divided into M vertical sections and N horizontal sections so that M × N sections of the divided video signal are separately recorded onto M × N recording media respectively. In this way, a high-definition television system video signal can be displayed on a plurality of ordinary television receivers without losing the high-definition television system picture quality.

16 Claims, 4 Drawing Sheets

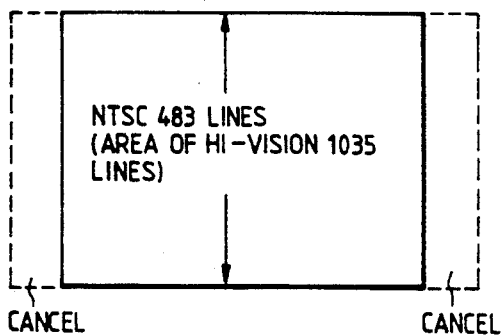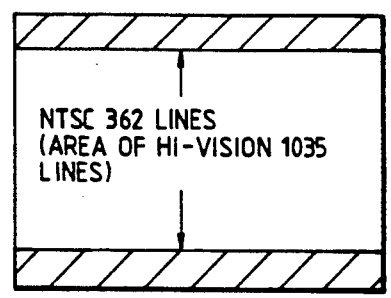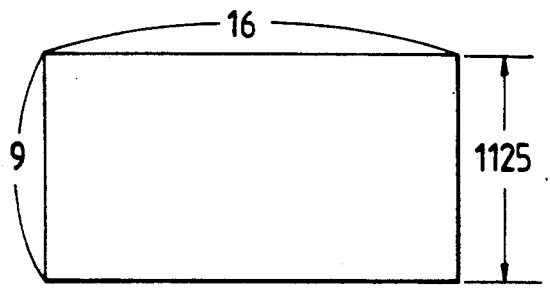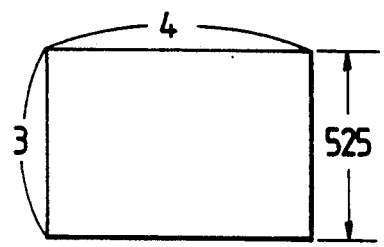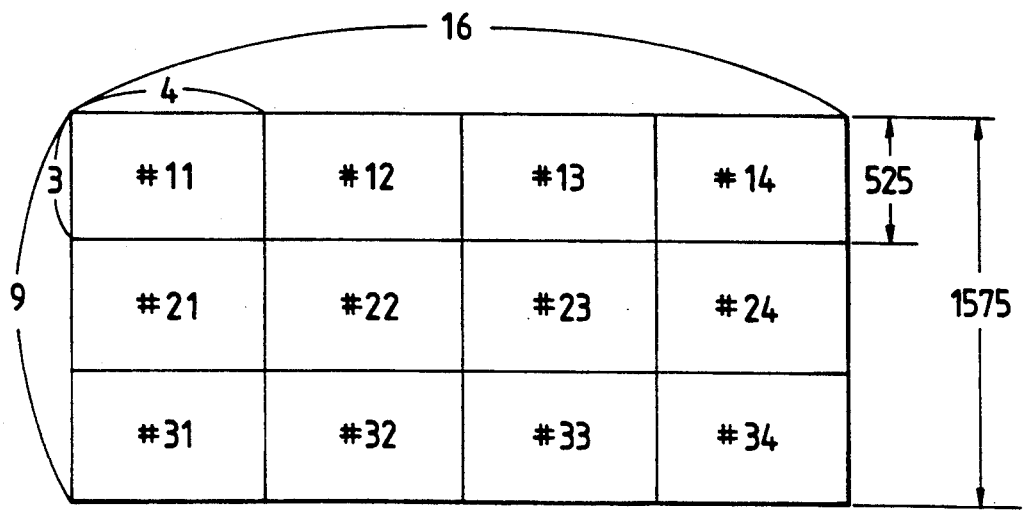

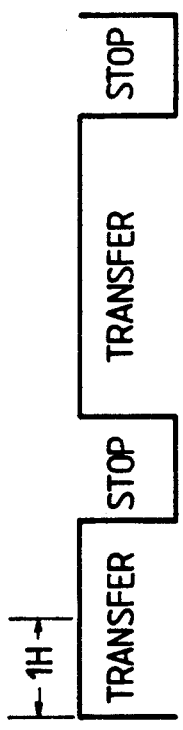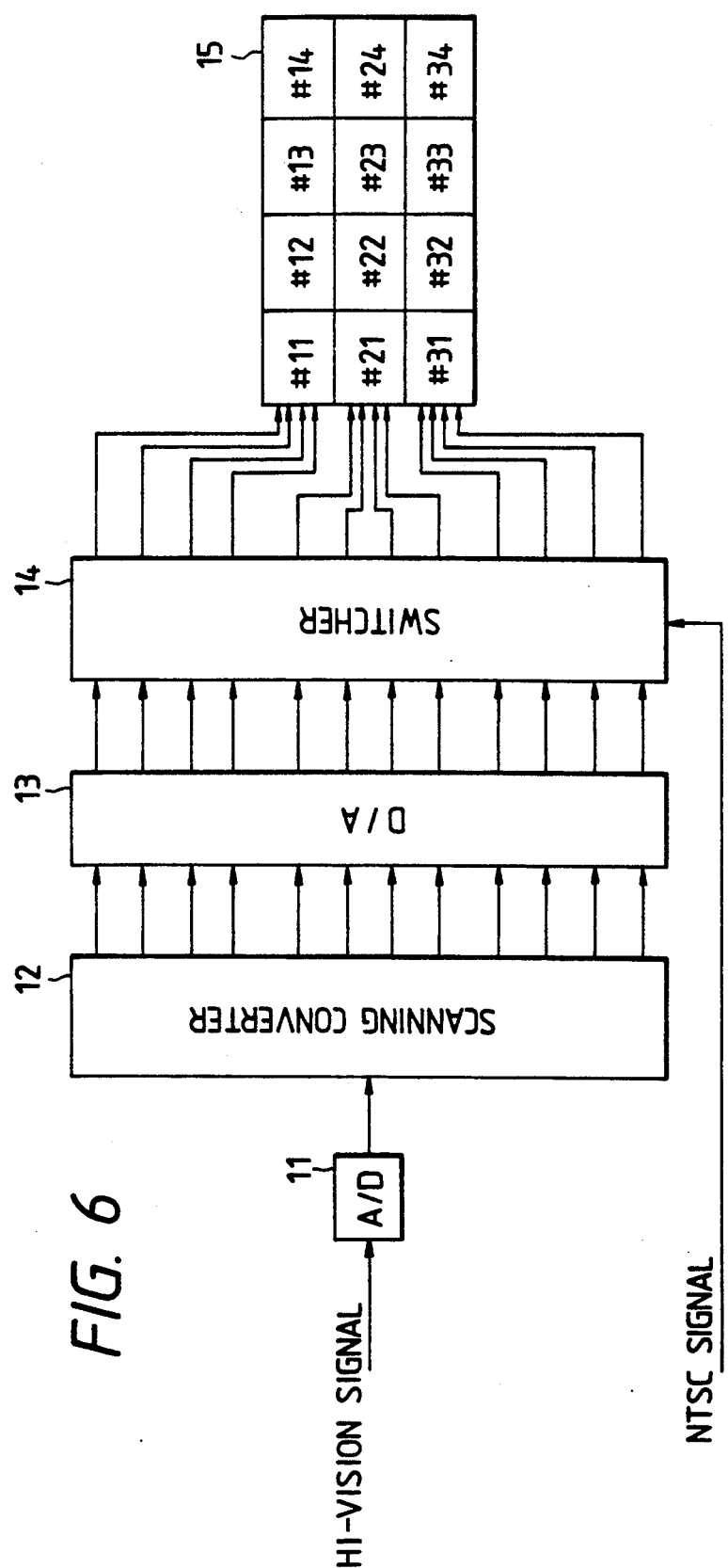
FIG. 5
FIG. 6

VIDEO SIGNAL RECORDING SYSTEM AND PICTURE DISPLAY SYSTEM IN A HIGH-DEFINITION TELEVISION SYSTEM

BACKGROUND OF THE INVENTION

The present invention relates to a picture signal recording apparatus in which one picture area in a high-definition television system is divided into a plurality of picture areas in an existing ordinary television system, and the divisional picture areas are recorded on a plurality of recording media respectively. The present invention further relates to a picture display system in which the divisional picture areas are displayed on a plurality of existing ordinary television receivers, respectively.

As a new television system replacing the existing ordinary television system, there has been proposed a high-definition television system, such as, for example, a Hi-Vision system, in which not only the picture quality and sound quality are improved, but also high visual mental effects such as realistic feeling, powerfulness, etc., far superior to those in the existing ordinary television system can be produced.

The Hi-Vision system differs significantly in picture-scene system, scanning system, and sound system, from the existing television system, for example, an NTSC system. As a result, a Hi-Vision signal cannot be reproduced as it is by use of an existing NTSC system television receiver. Accordingly, it has been proposed that the difference between the two systems, for example, the number of effective scanning lines, the aspect ratio, the field frequency, etc., be accommodated so that a signal of the Hi-Vision system is displayed after being converted into an NTSC signal.

FIGS. 1(a) and 1(b) are views showing examples of output pictures of a Hi-Vision/NTSC converter (a down converter). In FIG. 1(a), the 1035 effective scanning lines of the Hi-Vision system are reduced by about one half so as to be assigned to the 483 effective scanning lines of the NTSC system, and the picture elements are cancelled by 10% at left and right sides of the picture without changing the picture aspect ratio of 4:3 of the NTSC system, thereby obtaining an NTSC output. In this mode, the cancelled portions can be desirably selected.

In the example shown in FIG. 1(b), the 1035 effective scanning lines in the Hi-Vision system are reduced to about one-third so as to be assigned to the 362 effective scanning lines in the NTSC system, and an NTSC output is obtained without changing the picture aspect ratio of 16:9 of the Hi-Vision system. In this mode, the effective scanning lines are blanked by 10% at both the upper and lower portions of the picture area while the horizontal length agrees with that of the picture area of the Hi-Vision system.

In the conventional systems in which a Hi-Vision signal is displayed after being converted into an NTSC signal, there has been a disadvantage in that a picture having the high picture quality of the Hi-Vision system cannot be reproduced because the conversion of the Hi-Vision signal into the NTSC signal is made by reducing the horizontal scanning lines of the Hi-Vision signal. As a result, a picture having the composition expected in the Hi-Vision system cannot be obtained in the mode in which conversion is made by partially cutting off the picture.

SUMMARY OF THE INVENTION

It is therefore an object of the present invention to record a video signal according to a high-definition television system onto a recording medium after converting the video signal into a video signal according to the existing ordinary television system while maintaining the high quality of the former.

It is another object of the present invention to display a picture according to the high-definition television system by use of an existing ordinary television receiver while maintaining the high quality of the picture.

In order to attain the above objects, according to an aspect of the present invention, the video signal recording system is arranged so that the number of horizontal scanning lines of a high definition television system video signal is converted into M times as large as the number of horizontal scanning lines of a video signal according to an existing ordinary television system. The converted video signal is divided into M sections in the vertical direction and into N sections in the horizontal direction so that $M \times N$ sections of the divided video signal are separately recorded onto $M \times N$ recording media, respectively.

According to another aspect of the present invention, in the case where a Hi-Vision system is converted into an NTSC system, the video signal recording system is arranged so that the number of horizontal scanning lines of a video signal according to the Hi-Vision system is converted into three times as large as the number of horizontal scanning lines of a video signal according to the NTSC system, and the converted video signal is divided into three sections in the vertical direction and into four sections in the horizontal direction so that the twelve ($=3 \times 4$) sections of the divided video signal are separately recorded onto twelve recording media, respectively.

According to a further aspect of the present invention, the picture display system is arranged so that a video signal according to a high-definition television system is divided into a plurality of video signals according to an existing ordinary television system, whereby one picture according to the high-definition television system is displayed on one picture area constituted by a plurality of existing ordinary television receivers, and another picture according to an existing ordinary television system and different from the one picture is selectively displayed on at least one of the plurality of existing ordinary television receivers.

BRIEF DESCRIPTION OF THE DRAWINGS

FIGS. 1(a) and 1(b) are views showing examples of output pictures of down converters, respectively;

FIGS. 2(a) through 2(c) are views of picture area configurations for explaining the operation of the present invention;

FIG. 5 is a timing chart for explaining the operation of FIG. 4; and

FIG. 6 is a diagram showing the configuration of an embodiment of the picture display system according to the present invention.

DETAILED DESCRIPTION OF THE INVENTION

Figure 3:
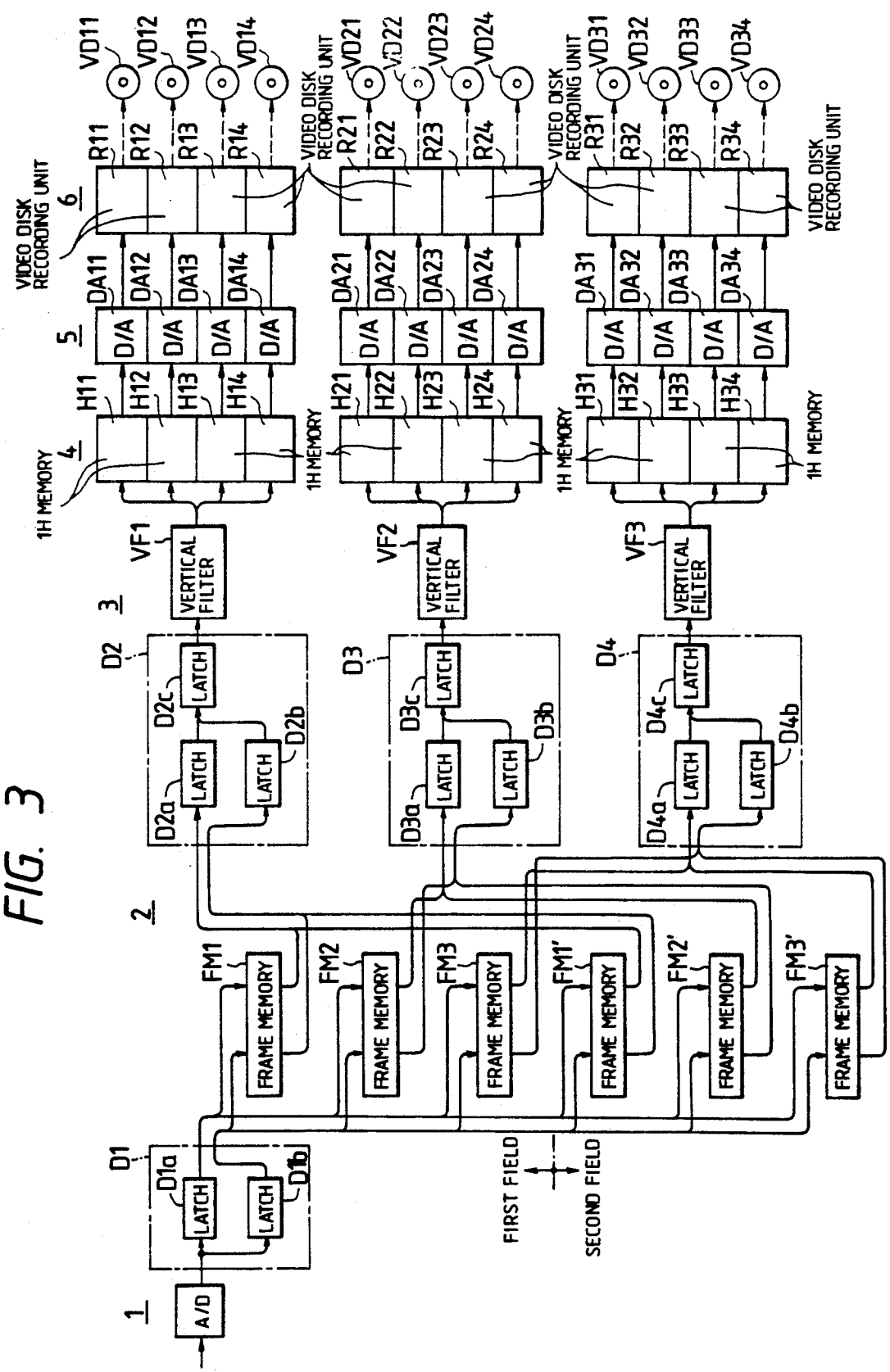
FIG. 3 is a diagram showing the configuration of an embodiment of the video signal recording system according to the present invention.

Referring to FIG. 2 showing the picture-area configurations, the operation of the present invention will be described. In the following, description will be made as to cases where a Hi-Vision system and an NTSC system are applied to the present invention as a high-definition television system and as an existing ordinary television system, respectively.

According to the basic Hi-Vision system, as shown in FIG. 2(a), the aspect ratio is 16:9, and the number of horizontal scanning lines in one frame is 1125, of which the number of the horizontal scanning lines in an available picture area appearing on an actual picture area is 1035.

On the other hand, according to the NTSC system, as shown in FIG. 2(b), the aspect ratio is 4:3, and the number of horizontal scanning lines in one frame is 525 of which the number of the horizontal scanning lines in an available picture area is 483.

According to the present invention, in order to reproduce a high-grade picture in the Hi-Vision system by use of NTSC television receivers, a picture area according to the Hi-Vision system is divided in the vertical direction into three sections and in the horizontal direction into four sections, that is, it is divided into twelve sections in total as shown in FIG. 2(c). The twelve divisional sections of the picture are reproduced respectively by twelve television receivers. Since the aspect ratio of each of the divisional picture sections is 4:3, the aspect ratio of the whole picture area is 16:9 which agrees with the aspect ratio according to the Hi-Vision system.

In this case, since the number of the horizontal scanning lines of each of the divisional picture sections is 525, 1575 ($=525\times 3$) horizontal scanning lines are required in order to display one picture on the twelve picture sections. Since the number of the horizontal scanning lines according to the Hi-Vision system is 1125, conversion of scanning lines is performed at a ratio of 5:7 to increase the number of scanning lines from 1125 to 1575.

Of the thus obtained 1575 horizontal scanning lines, the first one-third 525 horizontal scanning lines are divided into four sections which are successively assigned to four picture areas #11 through #14 on the upper stage, the next one-third 525 horizontal scanning lines are similarly divided into four sections which are successively assigned to four picture areas #21 through #24 on the middle state, and the last one-third 525 horizontal scanning lines are similarly divided into four sections which are successively assigned to four picture areas #31 through #34 on the lower stage.

In the video signal recording system according to the present invention, the picture on each of the thus assigned picture areas is recorded on one recording medium, for example, a video disk or a video tape. If the twelve video signals respectively separately recorded on the corresponding twelve recording media are reproduced on twelve NTSC television receivers by use of twelve reproducing apparatuses respectively at the same time, one picture according to the Hi-Vision system can be reproduced by use of the twelve NTSC television receivers while maintaining the high-grade property of the Hi-Vision picture.

In the picture display system according to the present invention, one picture according to the Hi-Vision system constituted by such assigned picture areas as described above is reproduced by using twelve NTSC receivers. Since each picture area is constituted by an NTSC television receiver, it is possible that a picture of the NTSC signal other than the picture of the Hi-Vision system is selectively displayed by at least one of the NTSC television receivers to thereby obtain a composite picture composed of pictures according to the Hi-Vision system and the NTSC system, respectively.

Referring to the drawings, embodiments of the present invention will be described hereunder.

FIG. 3 is a diagram showing the configuration of an embodiment of the video signal recording system according to the present invention.

The embodiment is constituted by an A-D converter portion 1, a vertical dividing portion 2, a scanning-line converting portion 3, a horizontal dividing portion 4, a D-A converter portion 5, and a recording portion 6. The A-D converter portion 1 converts an input Hi-Vision signal into a digital Hi-Vision signal. The vertical dividing portion 2 serves to vertically divide the digital Hi-Vision signal converted by the A-D converter portion 1 into three sections of the digital Hi-Vision signal for every frame and stores the three divisional sections of the Hi-Vision signal for every frame. The scanning-line converting portion 3 converts the horizontal scanning lines of each of the three sections of the digital Hi-Vision signal for each frame into the horizontal scanning lines according to the NTSC system at the rate of seven horizontal scanning lines according to the NTSC system for five horizontal scanning lines of the Hi-Vision signal. The horizontal dividing portion 4 divides the converted horizontal scanning lines of each of the three sections into four sections in the horizontal direction to thereby obtain twelve sets of data of horizontal scanning lines for every frame. The D-A converter portion 5 converts the twelve sets of horizontal scanning line data for every frame respectively into twelve sets of video signals according to the NTSC system for every frame. The recording portion 6 records the twelve sets of video signals onto twelve recording media, respectively.

More specifically, the A-D converter portion 1 is arranged to convert analog data of an input Hi-Vision signal into digital data of 8 bits based on a clock $\phi 1$ (for example, 48.6 MHz). The input Hi-Vision signal may be, for example, an output of a Hi-Vision VTR, an output of telecine equipment for converting a film picture into a Hi-Vision signal, an output of a MUSE decoder for converting a MUSE signal transmitted from a broadcasting satellite into a Hi-Vision signal, or the like.

The vertical dividing portion 2 is constituted by an input latch circuit D1, frame memories FM1 through FM3, frame memories FM1' through FM3', and output latch circuits D2, D3 and D4. The input latch circuit D1 serves to latch the digital data of the Hi-Vision signal A-D converted by the A-D converter portion 1. The frame memories FM1 through FM3 serve to vertically divide the digital data of horizontal scanning lines for the first field of the Hi-Vision signal latched in the latch circuit D1 into three sections, the three divisional sections of the digital data of horizontal scanning lines for the first field being stored in the frame memories FM1 through FM3, respectively. The frame memories FM1' through FM3' serve to store the three divisional sections of the data of horizontal scanning lines for the second field similarly to the frame memories FM1 through FM3. The output latch circuits D2, D3 and D4 serve to combine the digital data of horizontal scanning lines stored in the frame memories FM1 and FM1', to combine the digital data of horizontal scanning lines stored in the frame memories FM2 and FM2', and to combine the digital data of horizontal scanning lines stored in the frame memories FM3 and FM3', respectively. The thus combined digital data of horizontal scanning lines are fed to the scanning-line converting portion 3.

The input latch circuit D1 is constituted by latch circuits D1a and D1b for latching the A-D converted input Hi-Vision signal at negative and positive edges of a clock $\phi2$ (for example, 24.3 MHz), respectively. The output latch circuit D2 is constituted by a latch circuit D2a for latching the data of scanning lines for the first part of the first field, a latch circuit D2b for latching the data of scanning lines for the first part of the second field, and a latch circuit D2c for combining the respective outputs of the latch circuits D2a and D2b. The output latch circuit D3 is constituted by a latch circuit D3a for latching the data of scanning lines for the second part of the first field, a latch circuit D3b for latching the data of scanning lines for the second part of the second field, and a latch circuit D3c for combining the respective outputs of the latch circuit D3a and D3b. The output latch circuit D4 is constituted by a latch circuit D4a for latching the data of scanning lines for the third part of the first field, a latch circuit D4b for latching the data of scanning lines for the third part of the second field, and a latch circuit D4c for combining the respective outputs of the latch circuits D4a and D4b.

In the thus configured vertical dividing portion 2, the first one-third, the second one-third, and the last one-third of the data of the horizontal scanning lines for the first field produced from the latch circuit D1a are written in the memories FM1, FM2, and FM3, respectively, at the timing of the negative edge of the clock $\phi2$, while the data of the horizontal scanning lines for the same field produced from the latch circuit D1b are written in the memories FM1, FM2 and FM3, respectively, at the timing of the positive edge of the clock $\phi2$. Thus, three divisional sections of the data of the horizontal scanning lines for the first field are stored in the memories FM1 through FM3, respectively. However, in the scanning-line converting portion 3, seven successive horizontal scanning lines are subject to operational processing to generate one horizontal scanning line, as will be described later. Accordingly, taking the case in which seven successive horizontal scanning lines occur over two successive frame memories, for example, FM1 and FM2, into consideration, the last three horizontal scanning lines (H) to be written into the upper state frame memory FM1 are simultaneously written also into the middle stage frame memory FM2. This applies to the other two successive frame memories, that is, the middle stage frame memory FM2 and the lower stage frame memory FM3, and the lower stage frame memory FM3 and the upper stage frame memory FM1.

Similar to the data of the horizontal scanning lines for the first field described above, the data of the horizontal scanning lines for the second field are stored in the frame memories FM1' through FM3', respectively.

Thus, the vertically divided three divisional sections of the data of horizontal scanning lines of the Hi-Vision signal for the first and second field, that is, for one frame, are stored in the frame memories FM1 through FM3 and FM1' through FM3' of the vertical dividing portion 2.

Next, the data of scanning lines written in the upper stage frame memory FM1 for the first field are read out at negative and positive edges of a clock signal of a clock $\phi3$ (for example, 11.3 MHz), respectively, and latched by the latch circuits D2a and D2b of the output latch circuit 2, respectively. The data latched by the latch circuits D2a and D2b are combined with each other by the latch circuit D2c actuated by the clock signal of a clock $\phi4$ (for example, 22.7 MHz) and the combined data are fed to a vertical filter VFI constituting the scanning-line converting portion 3. The data stored in the upper stage frame memory FM1' for the second field are similarly fed to the same vertical filter VF1 through the same latch circuit D2.

The data stored in the middle stage frame memories FM2 and FM2' for the first and second fields are similarly fed to a vertical filter VF2 through the latch circuit D3, and the data stored in the lower stage frame memories FM3 and FM3' are similarly fed to a vertical filter VF3 through the latch circuit D3.

The scanning-line converting portion 3 is constituted by the vertical filter VF1-VF3 having the same structure so as to convert the number of horizontal scanning lines at a ratio of 5:7 in each of the three divisional sections of the data of the horizontal scanning lines vertically divided by the vertical dividing portion 2.

Figure 4:
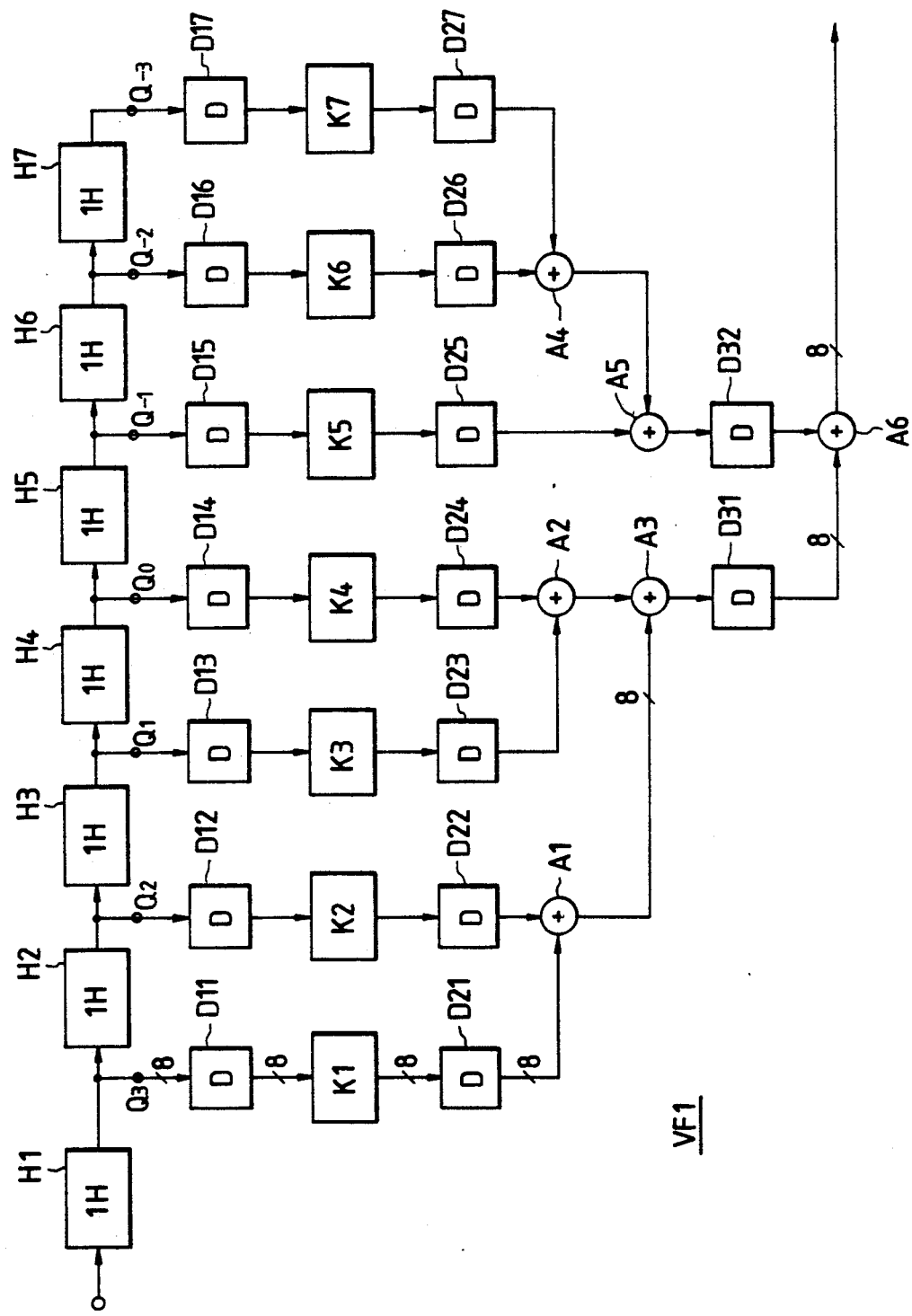
FIG. 4 is a diagram showing the configuration of a vertical filter of FIG. 3.

FIG. 4 shows the configuration of the vertical filter VF1. The vertical filter VF1 is constituted by seven 1H memories H1 through H7 each for delaying input data by 1H, the 1H memories H1 through H7 being connected in series. The respective outputs of the memories H1 through H7 are supplied, through latch circuits D11 through D17, to coefficient circuits K1 through K7 each constituted by a PROM for multiplying the input data thereto by a predetermined coefficient. The respective outputs of the coefficient circuits K1 through K7 are fed to latch circuits D21 through D27. The respective outputs of the latch circuits D21 through D24 are added to each other by adders A1 through A3, and the sum, that is the output of the adder A3, is supplied to a latch circuit D31. On the other hand, the respective outputs of the latch circuits D25 through D27 are added to each other by adders A4 and A5, and the sum, that is the output of the adder A5, is supplied to a latch circuit D32. The respective data thus latched in the latch circuits D31 and D32 are finally added to each other by an adder A6, and the sum, that is the output of the adder A6, is output. All the circuits constituting the vertical filter VF1 are driven by the signal of the clock $\phi4$, and each of the coefficient circuits K1 through K7 changes the coefficient at a period of 7H.

In the thus configured vertical filter VF1, assuming that a signal produced from a 1H memory in a certain 1H period and a signal produced from the same memory in the next 1H period are represented by $Q_n$ and $Q_{n+1}$ respectively, then the outputs Pi are expressed by the following equations:

$$P_0 = h_{-21}Q_{-3} + h_{-14}Q_{-2} + h_{-7}Q_{-1} + h_0Q_0 + h_7Q_1 +$$
$$h_{14}Q_2 + h_{21}Q_3$$

$$P_1 = h_{-19}Q_{-2} + h_{-12}Q_{-1} + h_{-5}Q_0 + h_2Q_1 + h_9Q_2 +$$
$$h_{16}Q_3 + h_{23}Q_4$$

$$P_2 = h_{-24}Q_{-2} + h_{-17}Q_{-1} + h_{-10}Q_0 + h_{-3}Q_1 + h_4Q_2 +$$

-continued $$P_3 = h_{-22}Q_{-1} + h_{-15}Q_0 + h_{-8}Q_1 + h_{-1}Q_2 + h_6Q_3 + h_{11}Q_3 + h_{18}Q_4$$

$$P_4 = h_{-20}Q_0 + h_{-13}Q_1 + h_{-6}Q_2 + h_1Q_3 + h_8Q_4 + h_{13}Q_4 + h_{20}Q_5$$

$$P_5 = h_{-18}Q_1 + h_{-11}Q_2 + h_{-4}Q_3 + h_3Q_4 + h_{10}Q_5 + h_{15}Q_5 + h_{22}Q_6$$

$$P_6 = h_{-23}Q_1 + h_{-16}Q_2 + h_{-9}Q_3 + h_{-2}Q_4 + h_5Q_5 + h_{17}Q_6 + h_{24}Q_7$$

$$P_7 = (P_0)$$
$$= h_{-21}Q_2 + h_{-14}Q_3 + h_{-7}Q_4 + h_0Q_5 + h_7Q_6 + h_{12}Q_6 + h_{19}Q_7$$

$$h_{14}Q_7 + h_{21}Q_8$$

Where $h_n$ designates an impulse response of the filter, and $h_n = h_{-n}$. Thus, the seven successive horizontal scanning lines are multiplied by predetermined coefficients respectively and added to each other so that one new horizontal scanning line is generated and supplied to the horizontal dividing portion 4.

FIG. 5 is a timing chart for explaining the operation for converting the horizontal scanning lines at a ratio of 5:7. Each 1H memory repeats the operation in which data is transferred in the first 2H period, no data is transferred in the next 1H period, data is transferred in the further next 3H period, and data transfer is stopped in the still further next 1H period. However, in each period, the constant in each coefficient circuit is changed every H and the output is operated every H, so that seven new horizontal scanning lines are generated from every five horizontal scanning lines.

The horizontal dividing portion 4 serves to divide, into four sections in the horizontal direction, the data of scanning lines produced from each of the vertical filters VF1 through VF3 constituting the scanning-line converting portion 3. More specifically, the output of the vertical filter VF1 is horizontally divided into four sections, the four divisional sections being stored in 1H memories H11 through H14 in accordance with the clock signal of the clock $\phi 4$. Similarly, the respective outputs of the vertical filters VF2 and VF3 are stored in 1H memories H21 through H24 and H31 through H34, respectively. Each of the 1H memories H11 through H34 includes two 1H memories so that the operation of writing the data into one 1H memory on the basis of the clock signal of the clock $\phi 4$ and the operation of reading the data from the other 1H memory on the basis of the clock signal of the clock $\phi 5$ (for example, 5.67 MHz) are alternately performed.

Thus, the twelve sets of data of horizontal scanning lines for one picture area respectively stored in the corresponding twelve 1H memories H11 through H14, H21 through H24, and H31 through H34 are supplied to the D-A converter portion 5 in which those twelve sets of data of horizontal scanning lines for one picture area are respectively converted into 12 sets of video signals of the NTSC system by D-A converters DA11 through DA14, DA21 through DA24, and DA31 through DA34 provided corresponding to the 1H memories H11 through H14, H21 through H24 and H31 through H35, respectively. The respective outputs of the D-A converters DA11 through DA14, DA21 through DA24, and DA31 through DA34 are supplied to video disk recording units R11 through R14, R21 through R24, and R31 through R35 constituting the recording portion 6. In the recording units R11 through R14, R21 through R24, and R31 through R34, the twelve sets of NTSC signals are recorded on twelve video disks VD11 through VD14, VD21 through VD24, and VD31 through VD34, respectively.

More specifically, the four sets of NTSC signals corresponding to the picture areas #11 through #14 shown at the upper stage in FIG. 2(c) are stored on the video disks VD11 through VD14, the four sets of NTSC signals corresponding to the picture areas #21 through #24 shown at the middle stage in FIG. 2(c) are stored on the video disks VD21 through VD24, and the four sets of NTSC signals corresponding to the picture areas #31 through #34 shown at the lower stage in FIG. 2(c) are stored on the video disks VD31 through VD34.

The twelve video disks VD11 through VD14, VD21 through VD24, and VD31 through VD34 are simultaneously reproduced by means of twelve video disk players respectively and are simultaneously displayed on the twelve NTSC television receivers respectively, so that a high-grade picture according to the Hi-Vision system can be reproduced by means of the television receivers according to the NTSC system.

In the video signal recording system according to the present invention, one picture according to the high-definition television system is divided into a plurality of sections of pictures compatible with the existing television system. The divisional sections of pictures are recorded on a plurality of recording media, and the recorded divisional sections of pictures are reproduced by means of the existing television receivers, so that the picture according to the high-definition television system can be reproduced with high-grade properties by use of the existing television receivers. Further, since the converted video signals are reproduced after once being recorded on recording media, the reproducing can be carried out by means of a simply-configured reproduction system according to the existing television reproducing system.

FIG. 6 is a view showing the configuration of an embodiment of the picture display according to the present invention.

The picture display system of this embodiment is constituted by an A-D converter portion 11 for converting a Hi-Vision signal into digital data; a scanning converter 12 for dividing the scanning line data of the Hi-Vision signal converted by the A-D converter portion 11 into three sections in the vertical direction and four sections in the horizontal direction for every frame so as to generate twelve sets of scanning-line data for every frame; a D-A converter portion 13 for converting the twelve sets of scanning line data into twelve sets of video signals according to the NTSC system; a switcher 14 for selectively switching between the twelve sets of converted NTSC signals and the other NTSC signals; and a display portion 15 having twelve NTSC television receivers for displaying the twelve sets of NTSC signals at the same time.

The scanning converter 12 is constituted by a vertical dividing portion 2, a scanning-line converting portion 3, and a horizontal dividing portion 4. Those constituent portions 2, 3 and 4 have been already illustrated in FIG. 3 and therefore the description about them will be omitted.

The operation of this embodiment will be described hereunder.

The A-D converter portion 11 converts an input Hi-Vision signal into digital data of 8 bits on the basis of a clock φ1 (for example, 48.6 MHz). The input Hi-Vision signal may be, for example, an output of a Hi-Vision VTR, an output of telecine equipment for converting a film picture into a Hi-Vision signal, an output of a MUSE decoder for converting a MUSE signal transmitted from a broadcasting satellite into a Hi-Vision signal, or the like. The converted Hi-Vision signal is supplied to an input latch circuit D1 of the scanning converter 12.

The twelve sets of horizontal scanning-line data of one picture area divided by the scanning converter 12 into three sections in the vertical direction and four sections in the horizontal direction are then converted respectively into twelve sets of NTSC signals by the D-A converting portion 13, and the D-A converted NTSC signals are simultaneously displayed on the display portion 14 constituted by the twelve NTSC television receivers through the switcher 14.

By substituting a part of the twelve sets of NTSC signals by other ordinary NTSC signals such as broadcasting signals according to the NTSC system, output signals of a video camera, or the like, through the switcher 14, it is possible to realize a composite picture composed of the Hi-Vision signals and a picture of the ordinary NTSC signals.

In the picture display according to the present invention, a picture of the high-definition television system can be displayed by use of a plurality of the existing ordinary television receivers while maintaining the high-grade property of the high-definition television system, and a composite picture composed of a picture of the high-definition television system and a picture of the existing television system can be obtained.

Although the case in which the Hi-Vision system is converted into the NTSC system has been described in the above embodiments, the present invention is of course applicable to a case in which, for example, an HD-MAC system is converted into a PAL system or a SECAM system.

What is claimed is:

1. A video signal recording system in which the number of horizontal scanning lines of a high-definition television video signal is converted into a converted video signal having a predetermined number of scanning lines equal to M times the number of horizontal scanning lines of a conventional video signal corresponding to an ordinary television video system, and said converted video signal is divided into M sections in the vertical direction and N sections in the horizontal direction so as to permit separate recording of M×N sections of said divided video signal onto M×N recording media respectively.

2. A video signal recording system as claimed in claim 1, wherein M is three, N is four, and M×N is twelve.

3. A video signal recording system in which a high-definition television system video signal is divided into a plurality of sets of horizontal scanning line data for recording on a corresponding plurality of recording media, comprising:

A-D converting means for converting said high-definition television system video signal into a digital high-definition television signal;

vertical dividing means coupled to said A-D converting means for dividing said digital high-definition television signal converted by said A-D converting means into three sections of said digital high-definition television signal for every frame and for storing said three sections of said digital high-definition television signal for every frame; p1 scanning-line converting means coupled to said vertical dividing means for converting horizontal scanning lines of each of said three sections of sad digital high-definition television signal for each frame into NTSC system horizontal scanning lines at a rate of seven NTSC system horizontal scanning lines for five high-definition television system scanning lines; and horizontal dividing means to said scanning-line converting means for dividing said converted horizontal scanning lines of each of said three sections into four horizontal sections to thereby obtain twelve of said sets of horizontal scanning line data for each frame.

4. A video signal recording system as claimed in claim 3, further comprising:

D-A converting means for converting said twelve sets of horizontal scanning line data for each frame respectively into twelve sets of NTSC video signals for each frame; and recording means for recording said twelve sets of video signals onto twelve recording media, respectively.

5. A video signal recording system as claimed in claim 3, wherein said A-D converting means converts said high-definition television system video signal into digital data of 8 bits based on a clock signal.

6. A video signal recording system as claimed in claim 3, wherein said high-definition television signal is one of an output of a high-definition VTR, an output of telecine equipment for converting a film picture into a high-definition signal, and an output of a MUSE decoder for converting a MUSE signal transmitted from a broadcasting satellite into a high-definition signal.

7. A video signal recording system as claimed in claim 3, wherein said vertical dividing means comprises:

input latch means for latching said digital high-definition television signal output from said A-D converting means;

first, second and third frame memories for vertically dividing horizontal scanning line digital data for a first field of said digital high-definition television signal latched into said input latch means into three sections and for storing said divided horizontal scanning line digital data for said first field into said first, second and third frame memories, respectively;

fourth, fifth and sixth frame memories for vertically dividing horizontal scanning line digital data for a second field of said digital high-definition television signal latched into said input latch means into three sections and for storing said divided horizontal scanning line digital data of said second field into said fourth, fifth and sixth frame memories, respectively; and output latch means for combining said divided horizontal scanning line digital data stored in said first and fourth frame memories, said second and fifth frame memories, and said third and sixth frame memories, respectively.

8. A video signal recording system as claimed in claim 7, wherein said input latch means comprises first and second latch circuits for latching said A-D converted digital high-definition television signal at negative and positive edges of a clock signal, respectively.

9. A video signal recording system as claimed in claim 7, wherein said output latch means comprises first, second and third latch circuits for latching said divided horizontal scanning line data for first, second and third parts of said first field, respectively;
fourth, fifth and sixth latch circuits for latching said digital horizontal scanning line data for first, second and third parts of said second field, respectively; and
seventh, eighth and ninth latch circuits for combining outputs of said first and fourth latch circuits, said second and fifth latch circuits, and third and sixth latch circuits, respectively.

10. A video signal recording system as claimed in claim 3, wherein said scanning line converting means comprises three vertical filters, each of said three vertical filters converting said horizontal scanning lines at a ratio of 5:7 in each of said three sections divided by said vertical dividing means.

11. A video signal recording system as claimed in claim 10, wherein each of said three vertical filters comprises:
a plurality of 1H memories connected in series, each of said IH memories for delaying input data by 1H;
a first plurality of latch circuits respectively connected to outputs of said plurality of 1H memories;
a plurality of coefficient circuits connected to said first plurality of latch circuits respectively for multiplying input data thereto by a predetermined coefficient;
a second plurality of latch circuits respectively connected to outputs of said plurality of coefficient circuits; and
a plurality of adders for adding outputs of said second plurality of latch circuits.

12. A video signal recording system as claimed in claim 3, wherein said horizontal dividing means comprises a plurality of 1H memories for storing said horizontal sections.

13. A video signal recording system as claimed in claim 3, further comprising:
D-A converting means for converting said twelve sets of horizontal scanning line data for each frame respectively into twelve sets of NTSC video signals for each frame;
switching means for selectively switching between said twelve sets of converted NTSC signals and other NTSC signals; and
display means having twelve NTSC television receivers for displaying one of said twelve sets OF NTSC signals simultaneously, a portion of said twelve sets of NTSC signals and said other NTSC signals simultaneously, and said other NTSC signals exclusively.

14. A method for recording a video signal onto a predetermined number of recording media, the method comprising the steps of:
converting a video signal having a first predetermined number of horizontal scanning lines into a converted video signal having a second predetermined number of horizontal scanning lines, wherein said second predetermined number is an integer multiple M of the number of horizontal scanning lines in a conventional video signal;
dividing said converted video signal into M sections in the vertical direction and N sections in the horizontal direction so as to produce M×N divided video signals, each of said M×N divided video signals corresponding to the format of said conventional video signal; and
separately recording said M×N divided video signals onto M×N recording media, respectively.

15. The method of claim 14, wherein M is equal to 3 and N is equal to 4.

16. The method of claim 14, wherein said converting step comprises increasing said first predetermined number of horizontal scanning lines by a predetermined ratio so as to produce said second predetermined number of horizontal scanning lines of said converted video signal.

* * * * *